(12) United States Patent
Vayanos et al.

(10) Patent No.: US 8,521,139 B2
(45) Date of Patent: Aug. 27, 2013

(54) TRANSMISSION OF NOTIFICATIONS FOR BROADCAST AND MULTICAST SERVICES

(75) Inventors: Alkinoos Hector Vayanos, Ann Arbor, MI (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 845 days.

(21) Appl. No.: 11/055,921

(22) Filed: Feb. 10, 2005

(65) Prior Publication Data

US 2006/0019641 A1 Jan. 26, 2006

Related U.S. Application Data

(60) Provisional application No. 60/544,283, filed on Feb. 11, 2004.

(51) Int. Cl.
*H04M 3/42* (2006.01)

(52) U.S. Cl.
USPC ........ 455/414.1; 455/412; 455/458; 455/438; 455/524; 455/558

(58) Field of Classification Search
USPC .............. 455/414.1, 558, 458, 438, 524, 412, 455/456.1–456.6; 370/390, 347, 328; 375/316, 375/130; 340/46
See application file for complete search history.

(56) References Cited

U.S. PATENT DOCUMENTS

| | | | | |
|---|---|---|---|---|
| 6,097,751 A * | 8/2000 | Relph | ............................ | 375/130 |
| 6,647,028 B1 | 11/2003 | Lancon et al. | | |
| 2002/0190881 A1 | 12/2002 | Low et al. | ....................... | 341/133 |
| 2003/0054807 A1 * | 3/2003 | Hsu et al. | ........................ | 455/414 |
| 2003/0088695 A1 | 5/2003 | Kwak et al. | ..................... | 709/238 |
| 2003/0134640 A1 * | 7/2003 | Kim et al. | ....................... | 455/438 |
| 2004/0008679 A1 * | 1/2004 | Sinnarajah et al. | ............ | 370/390 |

(Continued)

FOREIGN PATENT DOCUMENTS

| | | |
|---|---|---|
| CN | 1476259 | 2/2004 |
| EP | 0940935 | 9/1999 |

(Continued)

OTHER PUBLICATIONS

3GPP TSG RAN 1, Meeting 39: "25.211 Change Request 193: Introduction of Mich" 25.221 CR 193, Nov. 15, 2004-Nov. 19, 2004, pp. 1-10 XP002329099 Shin-Yokohama, Japan.

(Continued)

*Primary Examiner* — Kiet Doan
*Assistant Examiner* — Michael T Vu
(74) *Attorney, Agent, or Firm* — Abdollah Katbab

(57) ABSTRACT

To transmit notification indicators for broadcast and multicast services, a base station maps the services to random sequences based on their identifiers. The base station generates the random sequence for each service based on a hash function or a PN generator and the service identifier. Each random sequence is associated with a specific location for sending a notification indicator in each frame. The locations for the notification indicators for each random sequence are randomized with respect to the locations for the notification indicators for each remaining random sequence. This randomness characteristic reduces the likelihood of false alarm. For each service, the base station sets the notification indicators to the same notification value in each modification period. The base station transmits the notification indicators for each service at the random locations determined by the random sequence for the service.

17 Claims, 6 Drawing Sheets

(56) References Cited

U.S. PATENT DOCUMENTS

| | | | |
|---|---|---|---|
| 2004/0087320 A1* | 5/2004 | Kim et al. | 455/458 |
| 2004/0227618 A1* | 11/2004 | Hwang et al. | 340/7.46 |
| 2005/0084036 A1* | 4/2005 | Luo et al. | 375/316 |
| 2005/0101351 A1* | 5/2005 | Lee et al. | 455/558 |

FOREIGN PATENT DOCUMENTS

| | | |
|---|---|---|
| EP | 1283648 | 2/2003 |
| EP | 1377099 | 1/2004 |
| WO | WO04017581 | 2/2004 |

OTHER PUBLICATIONS

TIA/EIA/IS-95-A; "Mobile Station-Base Station Compatibility Standard for Dual-Mode Wideband Spread Spectrum Cellular System" (May 1995).

TIA/EIA/IS-856-1;"CDMA2000 High Rate Packet Data Air Interface Specification" Addendum 1 (Jan. 2002).

International Search Report—PCT/US05/004683, International Search Authority-European Patent Office-Jun. 6, 2005.

International Preliminary Report on Patentability—PCT/US05/004683, International Search Authority-European Patent Office-Aug. 12, 2008.

Partial European Search Report—EP10161776, Search Authority—Munich Patent Office, Jul. 27, 2010.

Physical layer issues for MBMS notification 3GPP Draft; R1-040018 MBMS Notification Phy Issues, 3RD Generation Partnership Project (3GPP), Mobile Competence Centre ; 650, Route Des Lucioles ; F-06921 Sophia-Antipolis Cedex; France, vol. Ran WG1, No. Espoo, Finland; 20040120, Jan. 20, 2004 (2004-01-20), XP050111947 [retrieved on Jan. 20, 2004].

Qualcomm, "MBMS PICH", 3GPP TSG-RAN WG2 meeting #40, Jan. 12-16, 2004, Sophia Antipolis, France, R2-0440034.

Samsung, "MBMS Notification Solution using PICH", 3GPP TSG RAN WG2 on MBMS, Paris, France, May 15-16, 2003, R2-030914.

Taiwan Search Report—TW094104232—TIPO—Jun. 18, 2011.

European Search Report—EP11154868—Search Authority—Munich—Feb. 29, 2012.

Siemens, "MBMS Notification Mechanism", 3GPP TSG RAN WG2 MBMS adhoc Tdoc R2-030892, May 15, 2003.

Written Opinion—PCT/US2005/004683, International Search Authority, European Patent Office, Jun. 6, 2005.

* cited by examiner

US 8,521,139 B2

TRANSMISSION OF NOTIFICATIONS FOR BROADCAST AND MULTICAST SERVICES

CLAIM OF PRIORITY UNDER 35 U.S.C. §119

The present Application for Patent claims priority to Provisional Application Ser. No. 60/544,283, entitled "Reduction of False Alarm in the Context of a Multimedia Broadcast/Multicast Service (MBMS)," filed Feb. 11, 2004, and assigned to the assignee hereof and hereby expressly incorporated by reference herein.

BACKGROUND

I. Field

The present invention relates generally to communication, and more specifically to techniques for transmitting and receiving notifications for broadcast and multicast services in a communication system.

II. Background

A communication system may provide unicast, multicast, and/or broadcast services. A unicast service provides point-to-point communication between at least one base station and a specific wireless device. A multicast service provides point-to-multipoint communication between at least one base station and a group of wireless devices. A broadcast service provides point-to-multipoint communication between at least one base station and all wireless devices within a designated broadcast area. Some examples of multicast and broadcast services include news and data services, subscription-based services, push-to-talk, and so on. Multicast and broadcast services may send data to wireless devices sporadically, periodically, or continuously.

The communication system may need to send signaling (e.g., control information, configuration information, and so on) for the broadcast and multicast services supported by the system. This signaling may be sent on a control channel. A wireless device receiving one or more services would then monitor the control channel for signaling sent for the service(s) being received. The wireless device may operate in an idle state whenever it is not actively exchanging data with one or more base stations in the system. In the idle state, the wireless device wakes up periodically to receive page messages and overhead messages from the system and powers down as much circuitry as possible in the remaining time in order to conserve battery power. It is highly desirable for the wireless device, while it is awake, to somehow be informed of any signaling being sent on the control channel for the service(s) being received. The wireless device would then be able to receive both pertinent messages for itself and signaling for the service(s) being received without expending too much battery power.

There is therefore a need in the art for techniques to send notifications for signaling sent for broadcast and multicast services.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Techniques for transmitting and receiving notification indicators for broadcast and multicast services in a communication system are described herein. A base station maps the services to random sequences, one random sequence for each service, based on identifiers for the services. The base station generates the random sequence for each service based on a hash function or a pseudo-random number (PN) generator and the service identifier. Regardless of how the random sequences are generated, each random sequence is associated with a specific location for sending a notification indicator in each frame. The locations for the notification indicators for each random sequence are randomized with respect to the locations for the notification indicators for each remaining random sequence. This randomness characteristic reduces the likelihood of false alarm, as described below. For each service, the base station sets the notification indicators to the same notification value in each modification period, which may be any duration of time. The base station transmits the notification indicators for each service on an MBMS Indicator Channel (MICH) at the random locations determined by the random sequence for that service. The base station also transmits paging indicators for each idle wireless device on a Page Indicator Channel (PICH) in frames assigned to the wireless device and at locations determined by a PICH sequence for the wireless device.

To receive the notification indicators for at least one desired service, a wireless device determines the random sequence for each desired service. The wireless device also determines the frames in which to receive its paging indicators. For each of these "awake" frames, the wireless device receives (1) the notification indicator for each service at the location on the MICH determined by the random sequence for the service and (2) the paging indicator for the wireless device at the location on the PICH determined by the PICH sequence. The wireless device determines the notification value for each service in each modification period based on all of the notification indicators received for that service in that modification period.

Figure 1:
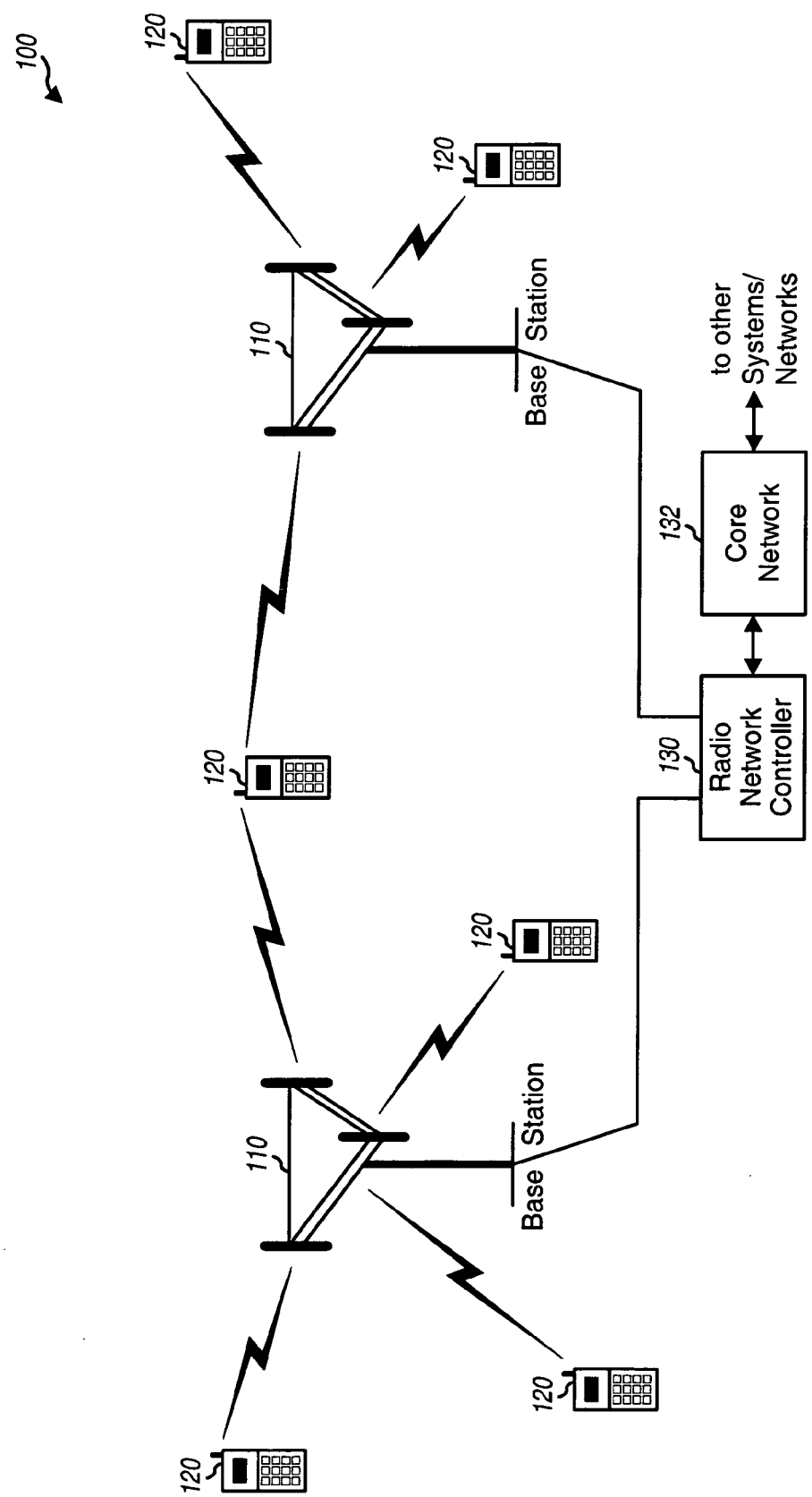
FIG. 1 shows a wireless communication system.

FIG. 1 shows a wireless communication system 100 capable of supporting multimedia broadcast and multicast services. System 100 includes base stations 110 that communicate with wireless devices 120. For simplicity, only two base stations 110 and six wireless devices 120 are shown in FIG. 1. A base station is a fixed station and may also be called a Node B, a base transceiver subsystem (BTS), an access point, or some other terminology. A wireless device may be fixed or mobile and may also be called a user equipment (UE), a mobile station, a terminal, or some other terminology.

A radio network controller (RNC) 130 couples to base stations 110 and provides coordination and control for these base stations. RNC 130 may also be called a base station controller (BSC) or some other terminology. A core network (CN) 132 couples to RNC 130 and other systems and networks, such as a public switched telephone network (PSTN), a packet switched data network, and so on. Core network 132 interconnects system 100 with these other systems and networks.

System 100 may be a Code Division Multiple Access (CDMA) system, a Time Division Multiple Access (TDMA) system, a Frequency Division Multiple Access (FDMA) system, an Orthogonal Frequency Division Multiple Access (OFDMA) system, or some other multiple access system. A CDMA system may implement one or more CDMA radio access technologies (RATs) such as Wideband-CDMA (W-CDMA) and cdma2000. cdma2000 covers IS-2000, IS-856, and IS-95 standards. A TDMA system may implement one or more TDMA RATs such as Global System for Mobile Communications (GSM). These various RATs and standards are well known in the art. UMTS is a system that uses W-CDMA and GSM as RATs and is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the notification transmission and reception techniques are specifically described below for UMTS. These techniques may be used for multimedia broadcast multicast service (MBMS) in UMTS.

In UMTS, a Page Indicator Channel (PICH) is used to send paging indicators to idle wireless devices. An idle wireless device is a wireless device that has registered with the system and is operating in an idle mode or a PCH mode. The paging indicators for each idle wireless device indicate whether messages are being sent on a Paging Channel (PCH) for the wireless device. The PCH is a transport channel that is carried in a Secondary Common Control Physical Channel (S-CCPCH). Each idle wireless device monitors the PICH for its paging indicators. If these paging indicators are set to '1', then the wireless device processes the S-CCPCH to look for any messages sent for the wireless device. A key characteristic of indicator channels such as the PICH and MICH is that the information carried on these channels is short and un-coded and can thus be received and interpreted very quickly.

Figure 2A:
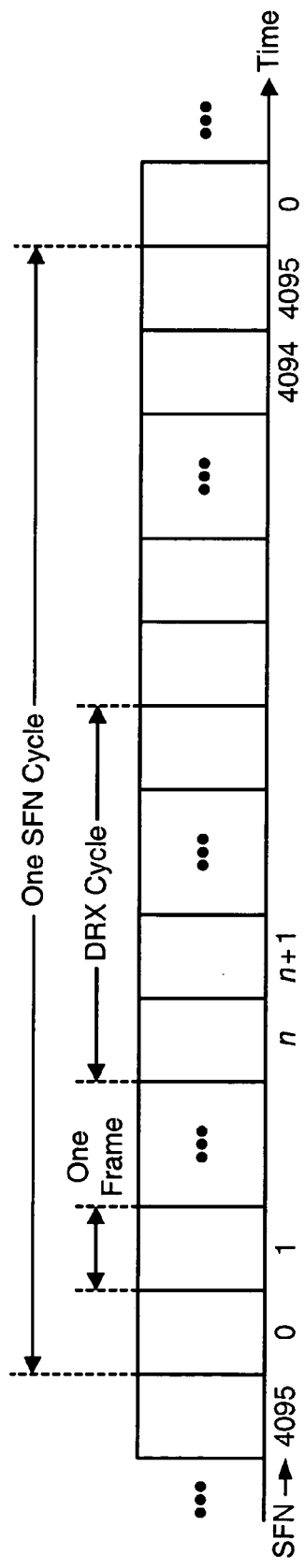
FIG. 2A shows the format of the PICH in Universal Mobile Telecommunication System (UMTS).

FIG. 2A shows the format of the PICH in UMTS. The PICH is partitioned into frames, with each frame having a duration of 10 millisecond (ms). Each frame is identified by a 12-bit system frame number (SFN) that is simultaneously transmitted on a Primary CCPCH (P-CCPCH). The SFN is reset to 0 at a specific time, incremented by one for each frame thereafter, and wraps around to zero after reaching the maximum value of 4095.

Each idle wireless device is assigned paging occasions, which are specific frames in which the wireless device can receive its paging indicators. The paging occasions for each wireless device are separated by a time interval called a DRX (discontinuous receiving mode) cycle. The DRX cycle is configurable for each wireless device and is typically 1.28 seconds. In general, the DRX cycle can range from 80 milliseconds (ms) to 5.12 seconds, or from 8 frames to 512 frames. The paging occasions for each wireless device are determined based on several parameters including an International Mobile Subscriber Identifier (IMSI), which is an identifier that is unique for each wireless device. Different wireless devices with different IMSIs may be assigned different paging occasions even if they have the same DRX cycle. The DRX cycles and the frames for UMTS correspond to slot cycles and slots, respectively, in some other systems that support slotted mode paging.

Figure 2B:
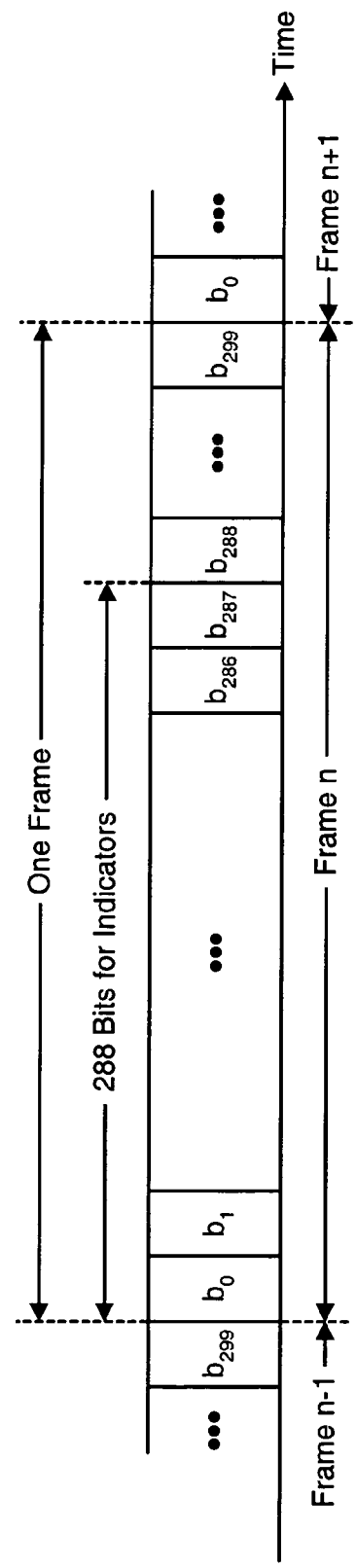
FIG. 2B shows the format of one frame of the PICH.

FIG. 2B shows the format of one frame for the PICH. Each PICH frame includes 300 bits, which are labeled as bits $b_0$ through $b_{299}$. The first 288 bits are used for Np paging indicators, and the last 12 bits are reserved for other uses. The number of paging indicators (Np) in each PICH frame is configurable by the system and can take on a value of 18, 36, 72 or 144. Each paging indicator is sent in 288/Np consecutive bits in the PICH frame, where 288/Np can take on a value of 16, 8, 4 or 2. The 288/Np bits are all set to '1' if the paging indicator is equal to '1' and are set to '0' if the paging indicator is equal to '0'. The Np paging indicators are sent in Np paging indicator locations that are numbered from 0 through Np−1 (not shown in FIG. 2B).

Each idle wireless device is associated with a paging indicator in each paging occasion. The paging indicator for each wireless device is sent at a location that is determined as follows:

$$q_P = \left(PI + \left\lfloor\left[\left(18 \times \left(SFN + \left\lfloor\frac{SFN}{8}\right\rfloor + \left\lfloor\frac{SFN}{64}\right\rfloor + \left\lfloor\frac{SFN}{512}\right\rfloor\right)\right) \bmod 144\right] \times \frac{Np}{144}\right\rfloor\right) \bmod Np, \quad \text{Eq (1)}$$

where
SFN is the system frame number for the paging occasion;
PI=(IMSI div 8192) mod Np;
$\lfloor x \rfloor$ is a floor operator that provides the next lower integer value for x;
mod denotes a modulo operation; and
$q_p$ is the location of the paging indicator within the paging occasion.

As shown in equation (1), the location of the paging indicator for a given wireless device changes among the Np possible locations based on the SFN of the paging occasion. Thus, depending on the SFN of the paging occasion, the wireless device would need to process a different location to obtain its paging indicator.

Equation (1) also indicates that up to Np non-overlapping sequences of paging indicators (or PICH sequences) may be formed. Each PICH sequence is associated with a different value of PI, which can range from 0 through Np−1 because of the modulo-Np operation to compute PI. Each PICH sequence is associated with a specific location for sending the paging indicator in each frame (or each SFN). The Np PICH sequences are non-overlapping in that no two PICH sequences use the same paging indicator location in any frame. In fact, the (Np−1) PICH sequences for PI=1 through Np−1 are merely different shifted versions (by modulo Np) of the PICH sequence for PI=0.

Two wireless devices may map to the same PI value based on their IMSIs. These two wireless devices would then have the same PICH sequence, and their paging indicator locations would overlap in every frame. If these two wireless devices also have the same paging occasions, then their paging indicators would be sent in the same frames and at the same location in each frame. If multiple paging indicators are mapped to the same location, then a value of '1' is sent in the location if any one of these paging indicators is equal to '1', and a value of '0' is sent in the location if all of the paging indicators are equal to '0'. For two wireless devices with the same PICH sequence and paging occasions, whenever a paging indicator is set for one wireless device, the other wireless device would also (possibly erroneously) detect this paging indicator and would process the PCH to look for page messages.

In UMTS, an MBMS Indicator Channel (MICH) is used to send MBMS notification indicators (or simply, notification indicators) that indicate whether messages are being sent on an MBMS point-to-multipoint Control Channel (MCCH). The MCCH is a transport channel that is also carried in the S-CCPCH. The messages sent on the MCCH contain information that allows the wireless devices to receive an MBMS point-to-multipoint Traffic Channel (MTCH). Such information may indicate, for example, which services are active, how to decode the MTCH, whether soft combining is possible, and so on. The MTCH is a transport channel that carries traffic data or content for the services.

The MICH has a format that is similar to the PICH format shown in FIG. 2B. Each MICH frame includes 300 bits, which are labeled as bits $b_0$ through $b_{299}$. The first 288 bits are used for Nn notification indicators, and the last 12 bits are reserved. The number of notification indicators (Nn) in each MICH frame is configurable by the system and can take on a value of 18, 36, 72 or 144. Each notification indicator is sent in 288/Nn consecutive bits in the MICH frame, where 288/Nn can take on a value of 16, 8, 4 or 2. The Nn notification indicators are sent in Nn indicator locations that are numbered from 0 through Nn−1. Notification indicators may also be sent using the last 12 bits in each PICH frame.

Each multicast/broadcast service is assigned specific notification indicators, which are set to '1' whenever messages are being sent on the MCCH for the service. Each wireless device monitors the notification indicators for all of the services desired by the wireless device (or "desired services"). Whenever the notification indicator for any desired service is set, the wireless device further processes the S-CCPCH to look for messages sent for that service.

The notification indicators for all of the services supported by the system (or "supported services") may be sent on the MICH in a manner to achieve the following goals:

Minimize the awake time, and hence power consumption, for each idle wireless device to receive its paging indicator and the notification indicators for all desired services during each awake period;

Minimize false alarm caused by the overlapping of the notification indicators for different services; and Minimize transmit power used for the notification indicators for all supported services.

For the PICH, a false alarm occurs whenever a wireless device erroneously detects a paging indicator that is set for another wireless device as being set for itself. For the MICH, a false alarm occurs whenever a wireless device erroneously detects a notification indicator that is set for a non-desired service as being set for a desired service. In any case, a false alarm causes the wireless device to process the PCH or MCCH for messages that are not applicable for the wireless device, which consumes battery power and shortens standby time.

False alarms are inevitable for the PICH if there are more idle wireless devices than the number of available paging indicator locations, and the paging indicators for multiple wireless devices map to and overlap at the same location. However, false alarms for the PICH do not adversely impact performance for several reasons. First, each wireless device typically receives only a small number of pages, so the paging indicators for each wireless device are infrequently set and the number of false alarms is small. Second, not all wireless devices that map to the same PICH sequence have overlapping paging indicators since their paging occasions, which constitute an additional dimension by which to distinguish among the wireless devices, may be different. Third, the wireless devices typically need to detect their paging indicators as quickly as possible and often use an aggressive detection algorithm that can falsely declare a paging indicator as being set when such is not the case. Fourth, because the PICH is only monitored by idle wireless devices, a false alarm for the PICH merely impacts battery life but does not adversely impact service reception.

False alarms are also inevitable for the MICH if the number of supported services exceeds the number of available notification indicator locations. However, false alarms for the MICH may be more detrimental than false alarms for the PICH. For a wireless device that is not yet receiving a service, the impact of false alarms for the MICH may be some additional battery power consumption. For a wireless device that is already receiving a service and is not capable of concurrently receiving the MCCH and MTCH, a false alarm causes the wireless device to process the MCCH instead of the MTCH and results in data loss for the MTCH.

To achieve the first goal noted above for the notification indicators, each service may be assigned a notification indicator in each frame. If a message is to be sent on the MCCH for the service, then the notification indicators for the service are set to '1' for a period long enough so that even a wireless device with the longest possible DRX cycle is able to receive the notification indicator with good probability of detection.

Figure 3:
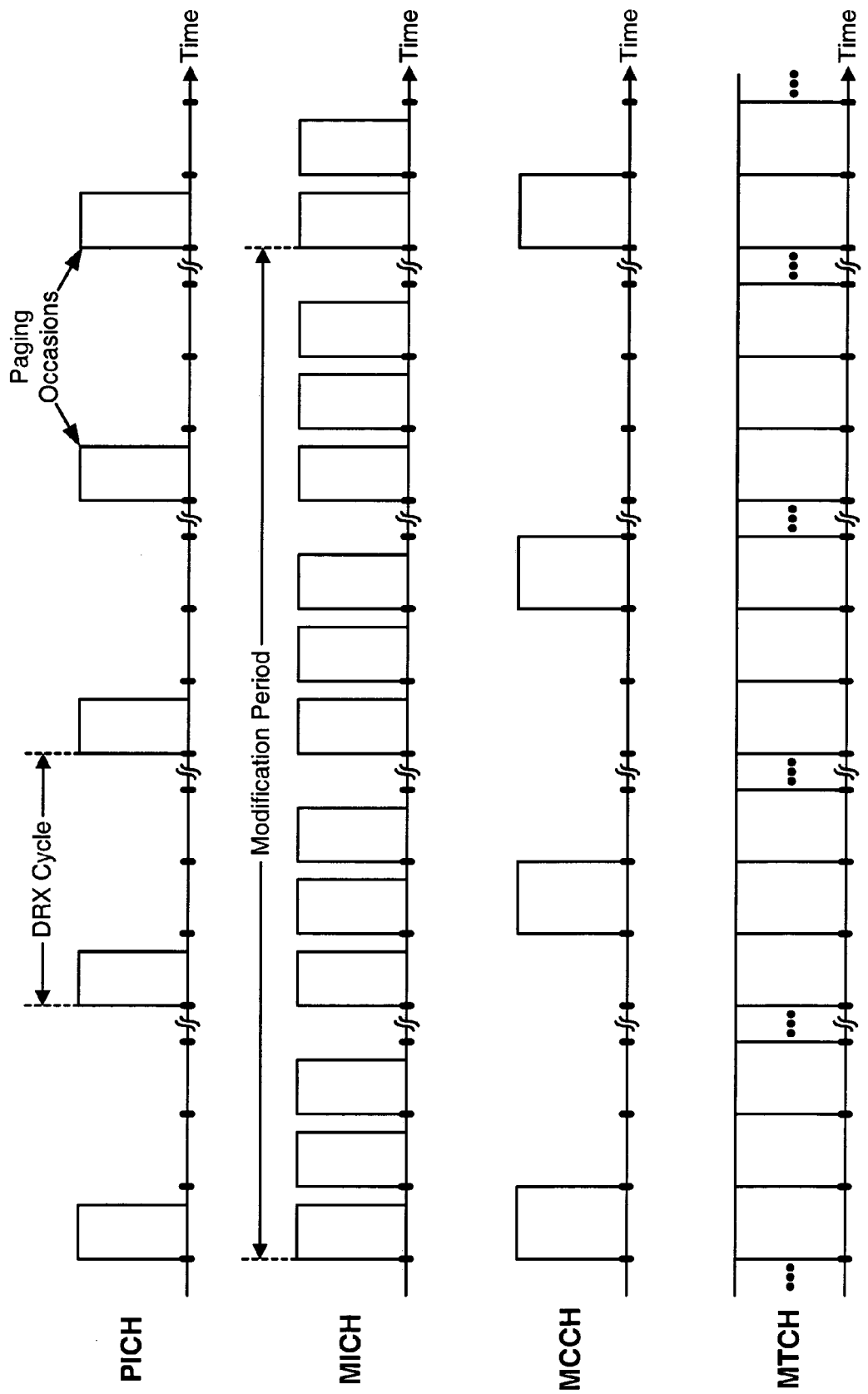
FIG. 3 shows exemplary transmissions on the PICH, MICH, MCCH and MTCH in UMTS.

FIG. 3 shows exemplary transmissions on the PICH, MICH, MCCH and MTCH. Paging indicators for each idle wireless device are sent on the PICH in paging occasions for the wireless device, as shown at the top of FIG. 3. The notification indicators for each service are sent in each frame on the MICH and are set to the same notification value (either '1' or '0') for the entire modification period. The modification period may represent a time interval in which "critical" signaling information, which is information that is needed in order to receive MBMS content, may be changed. In general, signaling information may be service independent information and/or service specific information.

The modification period is selected to be sufficiently long so that all wireless devices can reliably detect at least one notification indicator sent on the MICH during the modification period. A wireless device with a DRX cycle that is shorter than the modification period can read the MICH during its paging occasion in each DRX cycle. A wireless device with a DRX cycle that is longer than the modification period can wake up between paging occasions to read the MICH. The modification period may be selected to be equal to or greater than a predetermined minimum duration (e.g. 2 seconds) so that wireless devices with long DRX cycles do not need to wake up too frequently. Depending on how the DRX cycle and the modification period are configured, a wireless device may be able to read one or multiple notification indicators for each desired service in each modification period.

If the notification indicators for all supported services are sent in each MICH frame, then the only level of dimensionality is the number of indicator locations (Nn) within one MICH frame. If equation (1) is used to determine the location of the notification indicator for each service in each frame, then the notification indicators for any two services having the same PI value would overlap in each frame. False alarms for the MICH would then be dominated by the overlapping of the notification indicators for different services. If a notification is sent for a service, then all wireless devices interested in any one of the other services mapped to the same PICH sequence defined by equation (1) would erroneously detect this notification and would also process the MCCH. This would result in a high false alarm probability for the MICH, which is undesirable.

To reduce the likelihood of false alarm for the MICH, a large number of sequences of notification indicators (or random sequences) may be formed by randomizing the locations of the notification indicators for these random sequences. This randomization may be achieved in various manners, for example, by using a hash function, a PN generator, and so on. For clarity, several schemes for generating the random sequences are described below.

In a first randomization scheme, the random sequences are formed based on a hash function that maps each random sequence to a random location in each frame based on an identifier for the random sequence. Each random sequence is associated with a different NI value that can range from 0 through G−1, where G is a parameter that determines the number of possible random sequences.

For each random sequence, the location of the notification indicator in each frame may be determined as follows:

$$q_{n1} = \left\lfloor \{[C \times (NI \oplus ((C \times SFN) \bmod G))] \bmod G\} \times \frac{Nn}{G} \right\rfloor, \quad \text{Eq (2)}$$

where
C is a constant that is described below;
$\oplus$ denotes a bit-wise exclusive OR (XOR) operation; and
$q_{n1}$ is the location of the notification indicator within the frame.

The parameter G may be selected as a relatively large power of two and further based on a tradeoff between computational complexity and the probability of default collisions between the notification indicators for different services. Default collisions mean that the random sequences always share the same locations for their notification indicators. In an embodiment, G is selected as $G=2^{16}$, NI is a 16-bit value, and there are $2^{16}$ possible random sequences.

The constant C may be defined, for example, as follows:

$$C = \left\lceil G - \frac{(\sqrt{5}-1)}{2} \times G \right\rceil = 25,033. \quad \text{Eq (3)}$$

In general, the constant C may be defined such that C and G are relative primes.

Each service is identified by a service identifier, which may be a Temporary Mobile Group Identity (TMGI). The services may thus be uniquely identified by their TMGIs in the same way that the wireless devices may be uniquely identified by their IMSIs. Each service may be mapped to a specific NI value based on its TMGI, for example, as follows:

$$NI = \left( TMGI + \left\lfloor \frac{TMGI}{G} \right\rfloor \right) \bmod G. \quad \text{Eq (4)}$$

In general, each service may be mapped to a specific NI value based on any function of the service identifier. For example, the mapping may be based on a function $f(x)=(x+\lfloor x/G \rfloor + \lfloor x/G^2 \rfloor + \lfloor x/G^3 \rfloor \dots) \bmod G$, where x is the service identifier and f(x) is the NI value. Other functions may also be used to map service identifiers to NI values.

The hash function shown in equation (2) scrambles a function of SFN with a function of the service identifier (or NI) to ensure that different services are associated with different random locations for their notification indicators in different frames. The use of C and G in the hash function ensures that all indicator locations within each frame are equally likely to be allocated for each service.

From a complexity point of view, the hash function in equation (2) has an advantage in that it can be computed directly based on the SFN and NI values and does not require clocking a PN generator for each frame in which the wireless device was idle. Each value of $q_{n1}$ can be computed with three multiplications, an XOR operation, and a few truncations for the modulo operations.

In a second randomization scheme, the random sequences are formed based on a hash function that resembles the hash function for the PICH. Each random sequence is associated with a different NI value that can range from 0 through G−1. For each random sequence, the location of the notification indicator in each frame may be determined as follows:

$$q_{n2} = \left\lfloor \left[ \left( C \times \left( NI \oplus \left( SFN + \left\lfloor \frac{SFN}{8} \right\rfloor + \left\lfloor \frac{SFN}{64} \right\rfloor + \left\lfloor \frac{SFN}{512} \right\rfloor \right) \right) \right) \bmod G \right] \times \frac{Np}{G} \right\rfloor, \quad \text{Eq (1)}$$

where $q_{n2}$ is the location of the notification indicator within the frame.

The hash function shown in equation (5) also scrambles a function of SFN with a function of the service identifier to ensure that different services are mapped to different locations for their notification indicators in different frames. The hash function shown in equation (5) uses a different function of SFN than the hash function shown in equation (2). Each value of $q_{n2}$ can be computed with four additions, two multiplications, and few truncations.

In a third randomization scheme, the random sequences are formed based on a PN generator that selects different random indicator locations in different frames for each random sequence. The selection of the random indicator locations may be achieved in various manners. For clarity, a specific embodiment is described below. For this embodiment, the PN generator is implemented with a 16-bit linear feedback shift register (LFSR) that implements a selected generator polynomial. This generator polynomial may be, for example, $x^{16}+x^{12}+x^3+x+1$. The implementation of the linear feedback shift register is known in the art and not described herein. The shift register is reset to a predetermined non-zero value whenever the SFN wraps around (or rolls over) to zero. The content of the shift register at any time instant is not specific to any wireless device or any service. Each base station may thus maintain one PN generator for all supported services.

Each random sequence (and thus each service) is associated with a different NI value that can range from 0 through G−1. For each random sequence, the location of the notification indicator in each frame may be determined as follows:

$$q_{n3} = \left\lfloor r \times \frac{Np}{G} \right\rfloor, \quad \text{Eq (6)}$$

where
r is an intermediate 16-bit binary number generated with the PN generator; and
$q_{n3}$ is the location of the notification indicator within the frame.

Equation (6) indicates that the constant C, which is used for the hash functions in equations (2) and (5), is not needed for the third randomization scheme.

Each bit of the 16-bit binary number r may be determined based on the state of the shift register and the NI value for the random sequence. Each bit i of the number r may be determined, for example, by performing the following operations:

1. Clock the PN generator once to update the content of the shift register.
2. Perform a bit-wise AND operation between the updated content of the shift register and the NI value to generate a 16-bit number s.
3. Perform a modulo-2 summation over all 16 bits of the number s to obtain a binary value for bit i of the number r.

The set of operations described above is performed 16 times, once for each of the 16 bits of the number r. The shift register is thus clocked 16 times for each frame. The PN generator is also clocked for each frame in which the wireless device is asleep so that the PN generator is at the proper state. A single PN generator may be used to generate all G random sequences.

For the embodiment described above, the random sequences have a length of 4096 frames due to the use of a 16-bit linear feedback shift register for the PN generator and the clocking of the PN generator 16 times for each frame. Random sequences of longer or shorter lengths may be obtained by using PN generators with more or fewer bits. The length of the random sequences should be at least as long as the longest possible modification period.

In another embodiment of the third randomization scheme, different random sequences are associated with different seed values for the linear feedback shift register. These random sequences are thus mapped to different positions on a PN sequence generated by the PN generator. Each random sequence may be generated by, for example, initializing the PN generator with the associated seed value (e.g., whenever the SFN wraps around to zero), clocking the PN generator once for each frame, and performing a modulo-Nn operation on the content of the shift register to obtain the indicator location for the frame. For this embodiment, a PN generator is maintained for each random sequence to be generated. In yet another embodiment, each random sequence may be generated by resetting the PN generator (e.g., to a predetermined value whenever the SFN wraps around to zero), clocking the PN generator once for each frame, performing an exclusive-OR of the content of the shift register with a mask value for the random sequence, and performing a modulo-Nn operation on the result of the exclusive-OR operation to obtain the indicator location for the frame. For this embodiment, different random sequences are associated with different mask values, and a single PN generator may be used to generate all random sequences. The random sequences may also be generated in other manners using the PN generator.

Figure 4:
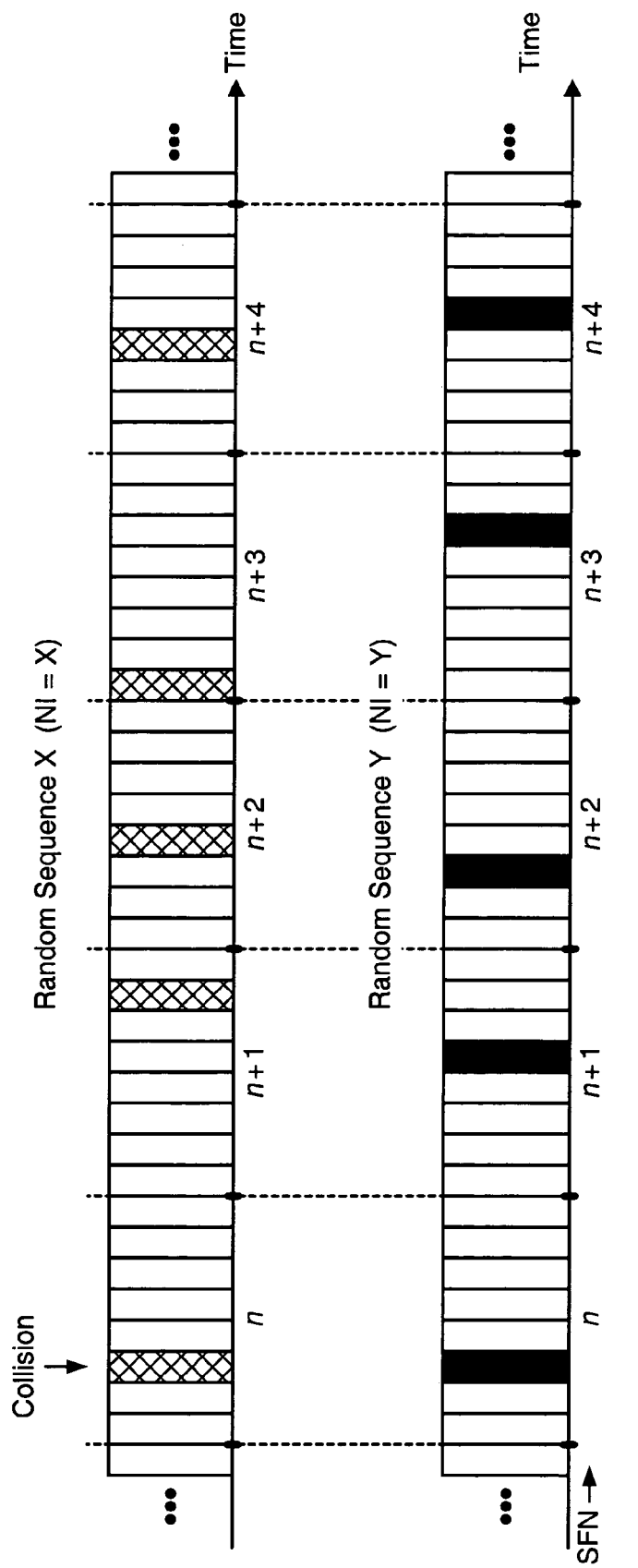
FIG. 4 shows two random sequences with random locations for notification indicators.

FIG. 4 shows two random sequences X and Y with random locations for the notification indicators. These two random sequences may be generated using a hash function or a PN generator. Random sequence X is generated with an NI value of X, and random sequence Y is generated with an NI value of Y, where X and Y may each be any value within the range of 0 through G−1.

For simplicity, FIG. 4 shows a case where Nn=8 and there are 8 indicator locations in each frame. For each random sequence, the notification indicator is sent in a random location in each frame. For the example shown in FIG. 4, random sequences X and Y collide and their notification indicators overlap in only frame n and no other frames shown in FIG. 4. If the notification indicators for only one random sequence are set to '1', then a wireless device may encounter a false alarm if it reads only the notification indicator sent in frame n. The wireless device would not encounter a false alarm if it reads the notification indicator sent in any other frame or if it reads multiple notification indicators. The wireless device may perform an AND of all of the notification indicators detected for each desired service and may process the MCCH only if all of the detected notification indicators are set. However, to avoid missing signaling information due to detection errors, the wireless device may process the MCCH if any one of the detected notification indicators is set or if some number or percentage of notification indicators is set.

Figure 5:
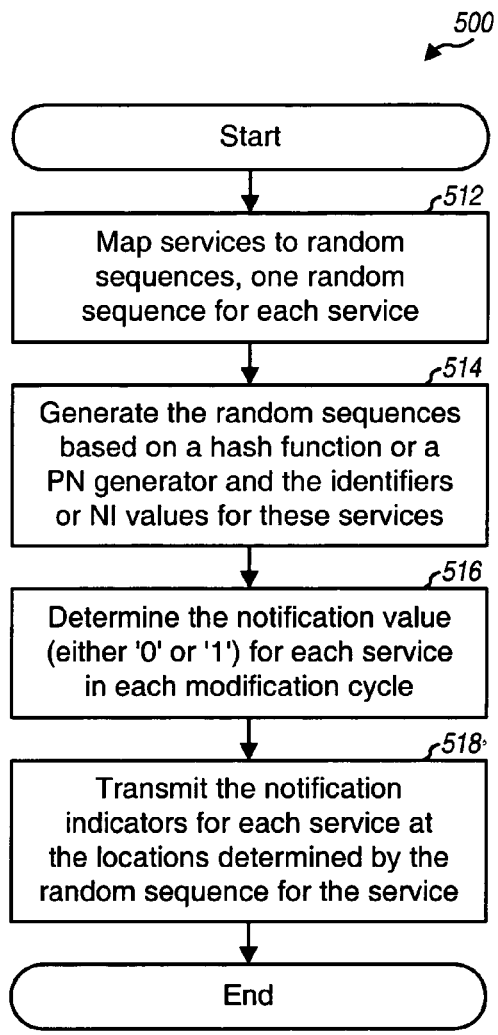
FIG. 5 shows a process performed by a base station to transmit notification indicators for broadcast and multicast services supported by the base station.

FIG. 5 shows a process 500 performed by a base station to transmit notification indicators for broadcast and multicast services supported by the base station. The base station maps the services to random sequences, one random sequence for each service (block 512). This may be achieved by mapping the identifier (e.g., the TMGI) for each service to an NI value, e.g., as shown in equation (4). The base station then generates the random sequence for each service based on a hash function (e.g., as shown in equation (2) or (5)) or a PN generator (e.g., as shown in equation (6)) and the identifier or NI value for the service (block 514). Regardless of how the random sequences are generated, each random sequence is associated with a specific location for sending a notification indicator in each frame. The locations for the notification indicators in different frames for each random sequence are randomized with respect to the locations for the notification indicators for each remaining random sequence.

The base station determines the notification value (either '0' or '1') for each service in each modification period (block 516). For each service, the base station sets the notification indicators for all frames in the modification period to the notification value for the service for that modification period. The base station also determines the indicator value to send for each location in which multiple notification indicators for multiple services map to the same location. In any case, the base station transmits the notification indicators for each service at the random locations determined by the random sequence for that service (block 518). The base station also transmits paging indicators for each idle wireless device on the PICH in the frames assigned to the wireless device and at locations determined by the PICH sequence for the wireless device.

Figure 6:
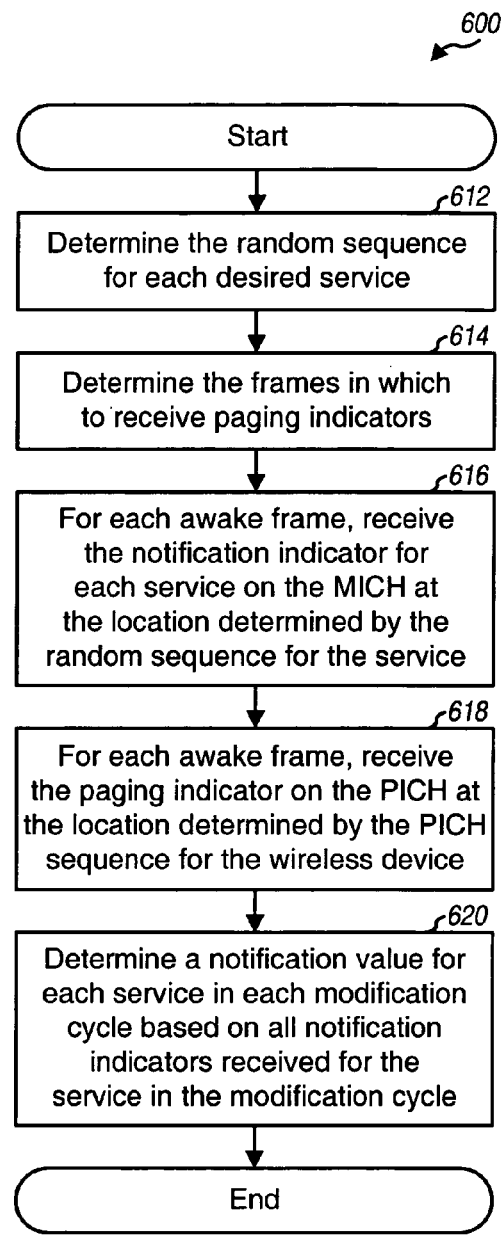
FIG. 6 shows a process performed by a wireless device to receive notification indicators for at least one service.

FIG. 6 shows a process 600 performed by a wireless device to receive notification indicators for at least one service desired by the wireless device. The wireless device determines the random sequence for each service in similar manner as the base station (block 612). The wireless device also determines the frames or paging occasions in which to receive paging indicators (block 614). For each of these awake frames, the wireless device receives the notification indicator for each service on the MICH at the location determined by the random sequence for the service (block 616). The wireless device also receives the paging indicator for itself on the PICH at the location determined by the PICH sequence for the wireless device (block 618).

The wireless device may elect to read any number of notification indicators for each service based on, for example, the desired probability of false alarm. The wireless device may wake up more often than its DRX cycle to receive more notification indicators and thus lower the probability of false alarm. In any case, the wireless device determines a notification value for each service in each modification period based on all of the notification indicators received for that service in that modification period (block 620).

The randomization of the indicator locations for the random sequences introduces additional dimensionality in time. This randomization further ensures that the collisions among the notification indicators for different services are spread uniformly across all services and are not correlated among any of these services. The likelihood of the notification indicators for two different services overlapping over an entire modification period is minimized. A wireless device is able to reduce the probability of false alarm for a given desired service by reading the MICH multiple times during the modification period to detect multiple notification indicators for the service. The wireless device may then process the MCCH if all of the detected notification indicators are set. The detected notification indicators are less likely to overlap the notification indicators for any one of the other services supported by the system. The probability of false alarm, which is the likelihood of all of the detected notification indicators being set to '1' by some other services, is relatively low and is dependent on the loading on the MICH. The probability of false alarm can be reduced by reading more notification indicators for the desired service. The wireless device can achieve a very low probability of false alarm by reading all notification indicators for the desired service, e.g., if the wireless device is actively receiving the service.

The false alarm performance for the three randomization schemes described above was analyzed. The analysis assumes that each notification indicator can be detected without error by the physical layer and any error is due to overlap between notification indicators for different services. For simplicity, the analysis also assumes that the indicator locations used for each service are perfectly random and the probability of an overlap between two notification indicators in different frames is perfectly independent.

The notification load of the system is denoted as $P_{load}$ and represents the probability of a given notification indicator being set to '1' on the MICH. The number of notification indicators that is detected for each desired service in each modification period is denoted as $N_{ni}$. For each service, the notification indicators are set to the same notification value for the entire modification period. All of the $N_{ni}$ detected notification indicators for a given desired service would be equal to '1' if a notification value of '1' is sent to indicate a notification for the desired service. If any one of the $N_{ni}$ detected notification indicators is equal to '0', then a notification value of '0' may be presumed to have been sent for the desired service, and any detected notification indicators that are equal to '1' are presumed to have been set by collision with the notification indicators for other services. To account for possible detection errors by the physical layer, a detection algorithm may declare a notification value of '0' if at least two detected notification indicators are equal to '0' and may declare a notification value of '1' otherwise. For this detection algorithm, a false alarm would occur if at least $N_{ni}-1$ detected notification indicators falsely indicate the presence of a notification.

For the detection algorithm described above, the probability of false alarm for a given service, $P_{FA}^{service}$, may be expressed as:

$$P_{FA}^{service} = \sum_{k=N_{ni}-1}^{N_{ni}} \binom{N_{ni}}{k} \times (P_{load})^k \times (1-P_{load})^{N_{ni}-k}, \qquad \text{Eq (7)}$$

where $$\binom{N_{ni}}{k}$$

denotes the number of different combinations of k notification indicators among $N_{ni}$ notification indicators. If a wireless device is interested in multiple ($N_{ser}$) services, then the probability of false alarm for the wireless device, $P_{FA}^{device}$, may be expressed as:

$$P_{FA}^{device} = 1-(1-P_{FA}^{service})^{N_{ser}}. \qquad \text{Eq (8)}$$

A computer simulation was performed to determine the probability of false alarm for a given wireless device with the three randomization schemes described above. The following parameter values were used for the simulation: $Nn=144$, $G=2^{16}$, $N_{ni}=5$, and $N_{ser}=10$. Table 1 shows the probability of false alarm for the wireless device for each randomization scheme and for different notification loads for the system. The simulation results indicate that all three randomization schemes provide lower probability of false alarm than without randomization, e.g., using equation (1). The simulation results also indicate that the probability of false alarm is lower with the hash function shown in equation (2) and the PN generator shown in equation (6).

TABLE 1

| | Probability of False Alarm | | | |
|---|---|---|---|---|
| | $P_{load}=5\%$ | $P_{load}=10\%$ | $P_{load}=20\%$ | $P_{load}=30\%$ |
| Without Randomization | 38.4% | 62.2% | 86.6% | 94.4% |
| Randomization with equation (2) | 0.14% | 0.84% | 6.39% | 19.6% |
| Randomization with equation (5) | 7.7% | 16.5% | 38.1% | 57.8% |
| Randomization with equation (6) | 0.02% | 0.36% | 4.68% | 16.1% |

The PICH uses quadrature phase shift keying (QPSK) for the paging indicators. Each paging indicator is represented by a set of modulation symbols. With QPSK, each modulation symbol is transmitted at a predetermined power level. The same amount of transmit power is used for each modulation symbol regardless of whether a value of '0' or '1' is sent for the paging indicator.

The MICH may be designed to use On/Off keying (OOK) for the notification indicators, which may reduce the amount of transmit power for the MICH. With OOK, a notification indicator value of '1' is transmitted at a predetermined power level, and a notification indicator value of '0' is transmitted with zero power (i.e., not transmitted). The transmit power for a notification indicator sent with OOK should be twice the transmit power for a notification indicator sent with QPSK in order to achieve the same detection performance for both OOK and QPSK. The total transmit power for the MICH is determined by the MICH loading, which is the average fraction of the notification indicators that are set to '1' in a given frame. A reduction in the total transmit power for the MICH is achieved if the MICH loading is less than 50%. The MICH loading is likely to be less than 50% in order to avoid high false alarm rates for the wireless devices. Thus, the use of OOK is likely to reduce the total transmit power for the MICH for the same detection performance as QPSK.

Figure 7:
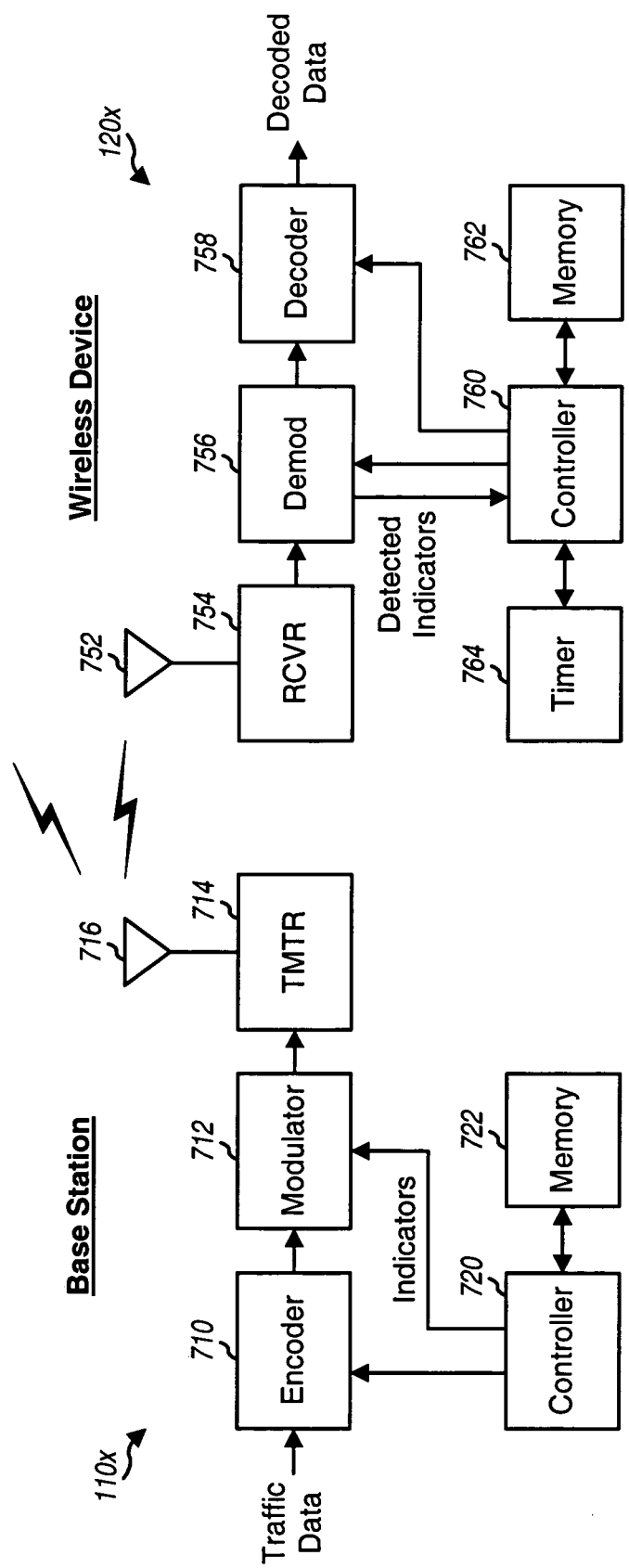
FIG. 7 shows a block diagram of the base station and the wireless device.

FIG. 7 shows a block diagram of an embodiment of a base station 110x and a wireless device 120x. At base station 110x, an encoder 710 receives traffic data for page and other messages, processes (e.g., encodes, interleaves, and symbol maps) the traffic data, and generates modulation symbols. A modulator 712 performs channelization, spectral spreading, scrambling, and so on, on the modulation symbols for various physical channels (e.g., the PICH, MICH, and S-CCPCH)

and provides a stream of data chips. A transmitter unit (TMTR) 714 conditions (e.g., converts to analog, amplifies, filters, and frequency upconverts) the data chips and generates a downlink signal, which is transmitted via an antenna 716.

At wireless device 120*x*, an antenna 752 receives the downlink signal from base station 110*x* and provides a received signal to a receiver unit (RCVR) 754. Receiver unit 754 conditions (e.g., filters, amplifies, and frequency downconverts) the received signal, digitizes the conditioned signal, and provides data samples. A demodulator (Demod) 756 processes the data samples and provides symbol estimates. Demodulator 756 further performs detection for notification indicators and paging indicators as directed by a controller 760. A decoder 758 processes (e.g., demaps, deinterleaves, and decodes) the symbol estimates and provides decoded data for messages sent by base station 110*x*.

Controllers 720 and 760 direct the operation at base station 110*x* and wireless device 120*x*, respectively. Controller 720 and 760 may also perform various functions for transmission and reception, respectively, of notification indicators and paging indicators. For example, controller 720 may perform process 500 in FIG. 5 for transmission of notification indicators, and controller 760 may perform process 600 in FIG. 6 for reception of notification indicators. Memory units 722 and 762 store data and program codes for controllers 720 and 760, respectively. A timer 764 provides time information, which is used by controller 760 to determine when to wake up to process the PICH and MICH.

The notification transmission and reception techniques described herein may be implemented by various means. For example, these techniques may be implemented in hardware, software, or a combination thereof. For a hardware implementation, the processing units used to transmit notification indicators may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to receive notification indicators may also be implemented within one or more ASICs, DSPs, and so on.

For a software implementation, the notification transmission and reception techniques may be implemented with modules (e.g., procedures, functions, and so on) that perform the functions described herein. The software codes may be stored in a memory unit (e.g., memory unit 722 or 762 in FIG. 7) and executed by a processor (e.g., controller 720 or 760). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving notifications for at least one service in a communication system, comprising:
   determining at least one random sequence for the at least one service including one random sequence for each service, each random sequence being associated with a location for sending a notification indicator in each frame, wherein the locations in each frame across a cycle of frames for notification indicators for each random sequence are randomized across the cycle of frames with respect to locations for notification indicators for each remaining random sequence;
   receiving at a receiver notification indicators in the cycle of frames for each of the at least one service at the locations determined by the random sequence for the service;
   obtaining at least two notification indicators in each modification period for each of the at least one service, the notification indicators for each service being set to same notification value in each modification period; and determining a notification value for each service in each modification period based on the at least two notification indicators obtained in the modification period for the service.

2. The method of claim 1, further comprising:
   determining frames in which to receive paging indicators; and
   receiving the notification indicators for the at least one service and the paging indicators in the determined frames.

3. The method of claim 1, further comprising:
   determining the number of notification indicators to receive in each modification period for each service based on a desired probability of false alarm.

4. The method of claim 1, further comprising:
   generating the at least one random sequence based on a hash function and an identifier for each service.

5. The method of claim 1, further comprising:
   generating the at least one random sequence based on a hash function comprised of a first function of frame number scrambled by a second function of service identifier.

6. The method of claim 1, further comprising:
   generating the at least one random sequence based on a pseudo-random number (PN) generator and an identifier for each service.

7. The method of claim 1, further comprising:
   determining the location for the notification indicator for each service in each frame based on the following equation:

$$q = \left\lfloor \{[C \times (NI \oplus ((C \times SFN) \bmod G))] \bmod G\} \times \frac{Nn}{G} \right\rfloor,$$

where
   C and G are two constants;
   SFN is a system frame number;
   Nn is the number of available locations in the frame;
   NI is a value determined by the identifier for the service;
   $\oplus$ denotes a bit-wise exclusive OR (XOR) operation;
   mod denotes a modulo operation;
   $\lfloor x \rfloor$ is a floor operator that provides the next lower integer value for x; and
   q is the location for the notification indicator within the frame.

8. An apparatus in a communication system, comprising:
a controller operative to determine at least one random sequence for at least one service including one random sequence for each service, each random sequence being associated with a location for sending a notification indicator in each frame, wherein the locations in each frame across a cycle of frames for notification indicators for each random sequence are randomized across the cycle of frames with respect to locations for notification indicators for each remaining random sequence; and
a demodulator operative to detect for notification indicators in the cycle of frames for each of the at least one service at the locations determined by the random sequence for the service, to detect at least two notification indicators in each modification period for each of the at least one service and to determine a notification value for each service in each modification period based on the at least two notification indicators obtained in the modification period for the service.

9. The apparatus of claim 8, wherein the controller is further operative to determine frames in which to receive paging indicators, and wherein the demodulator is further operative to detect for the notification indicators for the at least one service and the paging indicators in the determined frames.

10. The apparatus of claim 8, wherein the controller is further operative to generate the at least one random sequence based on a hash function or a pseudo-random number (PN) generator and further based on an identifier for each service.

11. An apparatus in a communication system, comprising:
means for determining at least one random sequence for at least one service including one random sequence for each service, each random sequence being associated with a location for sending a notification indicator in each frame, wherein the locations in each frame across a cycle of frames for notification indicators for each random sequence are randomized across the cycle of frames with respect to locations for notification indicators for each remaining random sequence;
means for receiving notification indicators in the cycle of frames for each of the at least one service at the locations determined by the random sequence for the service;
means for obtaining at least two notification indicators in each modification period for each of the at least one service, the notification indicators for each service being set to same notification value in each modification period; and
means for determining a notification value for each service in each modification period based on the at least two notification indicators obtained in the modification period for the service.

12. The apparatus of claim 11, further comprising:
means for determining frames in which to receive paging indicators; and
means for receiving the notification indicators for the at least one service and the paging indicators in the determined frames.

13. The apparatus of claim 11, further comprising:
means for generating the at least one random sequence based on a hash function or a pseudo-random number (PN) generator and further based on an identifier for each service.

14. A non-transitory processor-readable storage medium including processor-executable instructions stored thereon for executing a method of receiving notifications for at least one service in a communication system, the method comprising:
determining at least one random sequence for the at least one service including one random sequence for each service, each random sequence being associated with a location for sending a notification indicator in each frame, wherein the locations in each frame across a cycle of frames for notification indicators for each random sequence are randomized across the cycle of frames with respect to locations for notification indicators for each remaining random sequence;
receiving at a receiver notification indicators in the cycle of frames for each of the at least one service at the locations determined by the random sequence for the service;
obtaining at least two notification indicators in each modification period for each of the at least one service, the notification indicators for each service being set to same notification value in each modification period; and
determining a notification value for each service in each modification period based on the at least two notification indicators obtained in the modification period for the service.

15. The processor-readable storage medium of claim 14, further comprising processor-executable instructions for:
determining frames in which to receive paging indicators; and
receiving the notification indicators for the at least one service and the paging indicators in the determined frames.

16. The processor-readable storage medium of claim 14, further comprising processor-executable instructions for:
determining the number of notification indicators to receive in each modification period for each service based on a desired probability of false alarm.

17. A method of receiving notifications for at least one service in a communication system, comprising:
Determining at least one random sequence for the at least one service including one random sequence for each service, each random sequence being associated with a location for sending a notification indicator in each frame, wherein the locations in each frame across a cycle of frames for notification indicators for each random sequence are randomized across the cycle of frames with respect to locations for notification indicators for each remaining random sequence;
receiving at a receiver notification indicators in the cycle of frames for each of the at least one service at the locations determined by the random sequence for the service; and
determining the location for the notification indicator for each service in each frame based on the following equation:

$q = \{ \lfloor C \times (NI \oplus ((C \times SFN) \bmod G)) \rfloor \bmod G \} \times N_n/G$, where C and G are two constants; SFN is a system frame number; $N_n$ is the number of available locations in the frame; NI is a value determined by the identifier for the service; $\oplus$ denotes a bit-wise exclusive OR (XOR) operation; mod denotes a modulo operation; $\lfloor x \rfloor$ is a floor operator that provides the next lower integer value for x; and q is the location for the notification indicator within the frame.

* * * * *